United States Patent [19]
Pedziwiatr et al.

[11] Patent Number: 5,991,628
[45] Date of Patent: Nov. 23, 1999

[54] SCALABLE WIRELESS COMMUNICATION NETWORK AND METHOD

[75] Inventors: Joseph M. Pedziwiatr, LaGrange; Paul D. Steinberg, Bartlett; Armida R. Mackenzie, Hoffman Estates, all of Ill.

[73] Assignee: Motorola, Inc., Schaumburg, Ill.

[21] Appl. No.: 08/994,587

[22] Filed: Dec. 19, 1997

[51] Int. Cl.$^6$ ....................................................... H04Q 7/00
[52] U.S. Cl. .......................... 455/443; 455/426; 455/442; 455/561
[58] Field of Search ...................................... 455/422, 426, 455/436, 442, 443, 446–450, 455, 500, 507, 509, 516–517, 524–525, 62, 561–562; 370/320, 331, 335–337, 342–344, 347

[56] References Cited

U.S. PATENT DOCUMENTS

| | | | |
|---|---|---|---|
| 4,775,998 | 10/1988 | Felix et al. | 455/436 |
| 5,093,925 | 3/1992 | Chanroo | 455/450 |
| 5,208,847 | 5/1993 | Allen | 455/448 |
| 5,697,055 | 12/1997 | Gilhousen et al. | 455/513 |
| 5,790,528 | 8/1998 | Muszynski | 455/443 |

*Primary Examiner*—Doris H. To
*Attorney, Agent, or Firm*—Sayed Hossain Beladi

[57] ABSTRACT

A wireless communication system (100) includes a plurality of base station controllers (BSCs) (114, 116) logically sharing a plurality of base transceiver stations (BTSs) (124, 126) and which may physically share antenna and related transceiver equipment. The system (100) is configured to enhance system capacity while reducing the occurrence of seams (28) between service areas in the system (100).

21 Claims, 3 Drawing Sheets

SCALABLE WIRELESS COMMUNICATION NETWORK AND METHOD

FIELD OF THE INVENTION

The present invention relates generally to wireless communication networks, and more particularly, to a scalable wireless communication network and method of expanding capacity of a wireless communication network.

BACKGROUND OF THE INVENTION

Wireless communication systems, such as analog and digital cellular communication systems, personal communication systems (PCS) and other similar wireless communication systems, provide a great deal of freedom to their users. A wireless communication system user is almost always in touch whether on the road or at the home or office. And, in spite of the complexity underlying the wireless communication system, to the user the system is as easy to use as dialing a phone number.

Sometimes in wireless communication systems, a user will be unable to place or receive a call, or an ongoing call will be unexpectedly disconnected. One has to remember that at least a portion of the wireless communication system is a radio frequency (RF) link between a remote or mobile user and the system. There are a number of factors which influence how and why a call may not be completed or is disconnected. One cause lies with the limited number of radio frequency resources available for a given service area. Radio frequency resources are limited based in part on the allocation of radio frequency spectrum for particular applications. For example, television broadcasts are allowed a certain portion of the radio frequency spectrum while wireless communication networks are allocated another portion of the radio frequency spectrum. The allocations are such that operation of one system does not create interference in the other system due to radio frequency reuse.

However, certain wireless communication system architectures, such as those based upon the interim standard, IS-95-A for a code division multiple access (CDMA) wireless communication network, overcome radio frequency resource limitations by offering an ability to use common radio frequencies for multiple users. Capacity problems, or limitations on a user's ability to access and use these systems, may remain as a result of a limitation on the number of users the system can process. The solution here, of course, is to expand the capacity of the system. Unfortunately, present system architectures do not provide for ready expansion of system capacity.

For example, one would think simply adding additional equipment to handle the additional users would solve the capacity problems. However, the addition of equipment, and particularly in CDMA based wireless communication systems, creates certain system performance problems. For example, as additional system capacity in the form of additional base transceiver stations (BTSs), base station controllers (BSCs) and mobile switching centers (MSCs) is added, the aggregate area covered by each MSC/BSC/BTSs group becomes smaller. This means more seams, i.e., more interfaces between coverage areas.

Additional seams in the communication system may mean more frequent handoffs and particularly more "hard" handoffs. Additional seams may also require additional processing resource utilization and may result in increased voice delay due to traffic interconnect and increased latency on execution of call processing procedures. Seams require additional system engineering and in many cases lead to decreased call quality.

CDMA communication systems employ a process known as "soft" or "softer" handoff to reduce call quality degradation resulting from hard handoffs by permitting the mobile station to communicate with several BTSs. Soft handoff is advantageously employed when the mobile station is moving from an area covered by one BTS to an area covered by another BTS. In soft handoff, the mobile station is always in active communication with at least one BTS even as it moves through the system from BTS coverage area to BTS coverage area. This results from each of the BTSs operating under the control of a particular BSC using a common set of radio frequencies.

Hard handoff seams almost always have a negative effect on call quality and as such are avoided as much as possible. A hard handoff may occur as a mobile station moves from a geographic area served by a first BSC to a geographic area served by a second BSC. Handoff between a BTS serviced by the first BSC and a BTS serviced by the second BSC requires that a communication link be established in the second BSC through the appropriate BTS associated with the second BSC. When handoff is necessary, i.e., as the mobile station moves out of the service area of the first BTS into the area serviced by the second BTS, the mobile station must reestablish the call through the second BSC. Communication with multiple BTSs is generally not possible in this mode. More importantly, communication between the mobile station and the BTS/BSC is normally momentarily disrupted. Thus, one will appreciate that adding capacity in the form of additional MSCs, BSCs and BTSs will increase the number of seams, and particularly, may result in an increase in hard handoff seams and the associated disruption in service.

Therefore, there is a need for a wireless communication system architecture which is easily and readily scalable, expandable, as the number of users of the system expands. More importantly, such system expansion should be provided at minimum cost and without degrading system performance.

BRIEF DESCRIPTION OF THE DRAWINGS

FIG. 1 is a schematic illustration of a prior art wireless communication system.

FIG. 2 is a schematic illustration of a prior art wireless communication system expanded to double capacity.

FIG. 3 is a schematic illustration of the wireless communication system of FIG. 1 reconfigured in accordance with a preferred embodiment of the present invention.

DETAILED DESCRIPTION OF THE PREFERRED EMBODIMENTS

Figures 1, 2, 3:
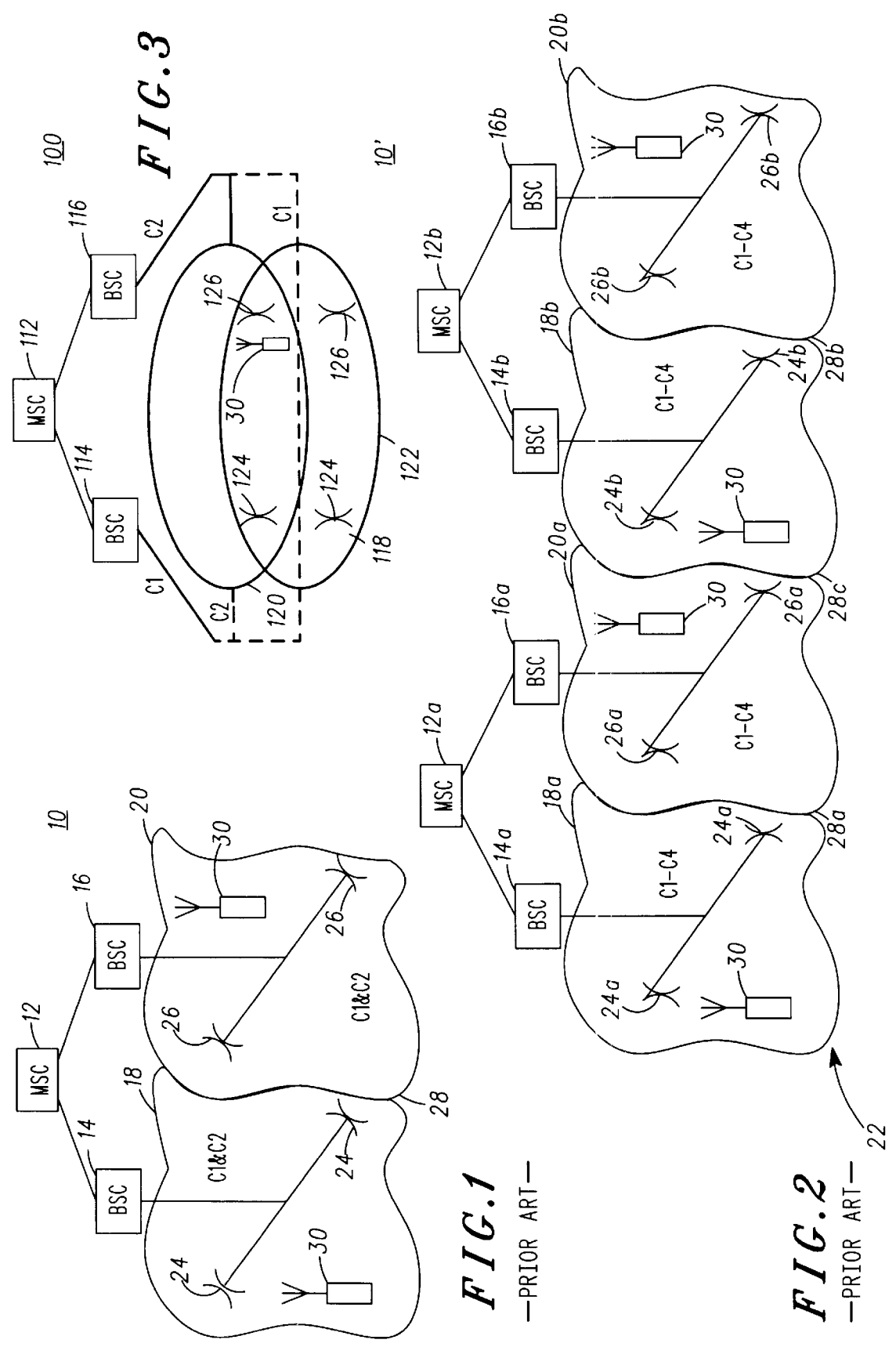
Figure 4:
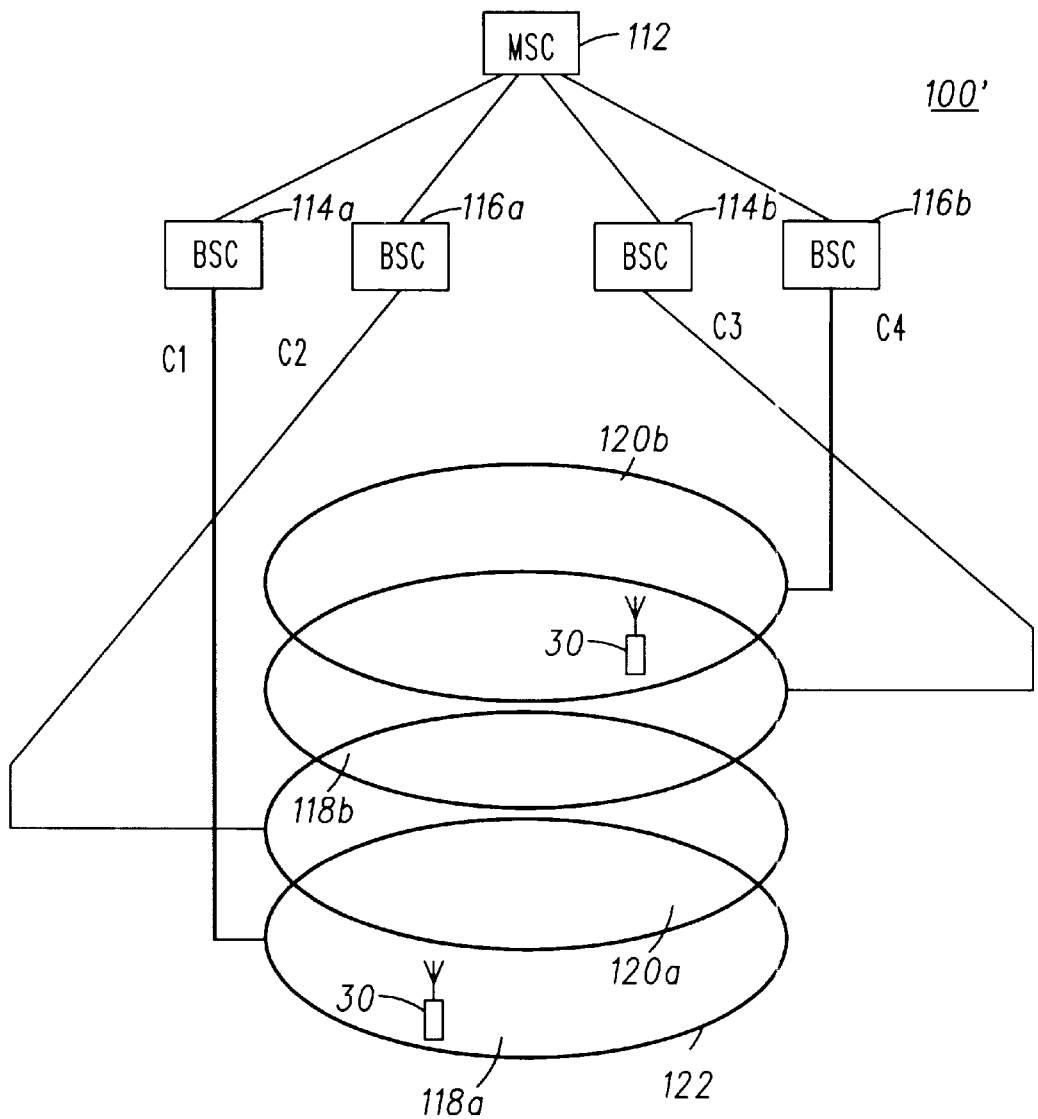
FIG. 4 is a schematic illustration of a wireless communication system expanded to double capacity in accordance with a preferred embodiment of the present invention.

The present invention will be described in terms of several preferred embodiments, and particularly, in terms of a wireless communication system in accordance with the IS-95-A standard for a code division multiple access (CDMA) wireless communication system. With reference to FIG. 1, for example, a prior art wireless communication system 10 includes a mobile switching center (MSC) 12, a first base station controller (BSC) 14 and a second BSC 16 each servicing service areas 18 and 20 of a total service area 22. As is known for such systems, each BSC 14 and 16 has associated therewith a plurality of base transceiver stations (BTSs), 24 and 26, respectively. While only two BTSs are shown per service area 18 and 20, it will be appreciated that additional or fewer BTSs may be implemented as required and without departing from the fair scope of the present invention. MSC 12, BSCs 14 and 16, and BTSs 24 and 26, are specified and operate in accordance with the IS-95-A standard for providing wireless communication services to mobile stations (generally shown as 30) operating in service areas 18 and 20. Again, however, the present invention is not limited to the particular communication standard implemented, and it is useful in such other standards such as analog cellular, Global System for Mobile Communications (GSM) digital cellular and IS-55 time division multiple access (TDMA) digital cellular as examples.

The BTSs associated with BSC 14, and in accordance with the IS-95-A standard, provide service in service area 18 using radio frequency channels, or carriers, C1 and C2. Likewise, BSC 16 provides service in area 20 using radio frequency channels C1 and C2. Partitioning of system 10 in this manner creates a hard handoff seam 28 between service areas 18 and 20. That is, as mobile station 30 moves from service area 18 to service area 20, a handoff of the mobile station 30 from BTS 24 associated with BSC 14 to BTS 26 associated with BSC 16 may be required.

In FIG. 2, an expansion scenario is shown for communication system 10 designated 10'. In FIG. 2, elements from system 10 carry the same numeral designation with the addition of a letter "a". Elements added to expand capacity carry like reference numerals of like elements of system 10 with the addition of a letter "b". The capacity of system 10' is doubled as compared to system 10 through the addition of MSC 12b and BSCs 14b and 16b. BTSs are not shown in FIG. 2 for simplicity but are understood to be utilized in each of the service areas, 18a, 20a, 18b and 20b. BSCs 14a and 16a continue to provide service to the respective service areas 18a and 20a. BSCs 14b and 16b provide service in service areas 18b and 20b. Each of BSCs 14a, 16a, 14b and 16b utilize carriers C1, C2, C3 and C4 for providing service to mobile stations operating in the respective service areas. As is most notable in FIG. 2, expansion of system 10 to system 10' in this manner has created additional hard handoff seams. Hard handoff seams 28a remains between BSC 14a and 16a, new seam 28b is created between BSC 14b and 16b, and new seam 28c is created between BSC 16a/MSC 12a and BSC 14b/MSC 12b. Moreover, the physical size of each service area is reduced leading to increased frequency of hard handoff. In this manner, system 10' offers increased capacity through the addition of two additional carriers and additional equipment but at the penalty of smaller service areas and more hard handoff seams.

With reference now to FIG. 3, system 10 of FIG. 1 is shown reconfigured as system 100 in accordance with a preferred embodiment of the present invention. System 100 includes BSCs 114 and 116 configured to provide service in each of service areas 118 and 120 on one of carriers C1 and C2, respectively. The BSCs 114 and 116 are shown to support a single carrier, CX, but it is understood that the illustrated carriers may be a carrier set. For example, carrier C1 may be a set of carriers including carriers CA, CB, . . . CN. Carrier sets C1 and C2 must, however, be distinct. In addition, it may be possible to provide a level of redundancy should either of BSCs 114 and 116 fail. In such an implementation, a carrier set, for example carrier set C2 assigned to BSC 116, may be used by an active BSC, i.e., BSC 114, in the event that a BSC, i.e., BSC 116, fails. This is illustrated in FIG. 3 with the aid of phantom lines.

The physical size of each of service area 118 and 120 corresponds with the total service area 122 of system 100, and each service area 118 and 120 covers substantially the same physical area as total service area 122. BSCs 114 and 116 are respectively coupled (utilizing suitable span and backhaul not shown) with base stations 124 and 126 which are now logically shared by both BSCs 114 and 116 for providing service to mobile stations 30 operating in either of service area 118 and 120.

As will be appreciated from FIG. 3, system 100 provides wireless communication service to the entire service area 122 without the hard handoff seam found in system 10. Each of BSCs 114 and 116 are advantageously coupled to utilize BTSs 124 and 126 and utilize either carrier C1 or C2 or both. Typical BTS equipment, such as that available from Motorola, Inc, Schaumburg, Ill., have multiple carrier capability. In system 100, a two carrier BTS is logically shared by each of BSCs 114 and 116. In the alternative, absent multiple carrier BTSs, two single carrier BTSs, utilizing a shared antenna and potentially other radio frequency transmission and reception hardware such as power amplifiers, up and down frequency converters and the like, may be coupled respectively to each of BSC 114 and BSC 116. In this later arrangement, multiple BTSs may be thought to logically share a same physical location and physically share transmission and reception hardware. As will be further appreciated, suitable span and backhaul (not shown) is provided and is distinct for each of BSC 114 and 116.

Mobile station 30 acquires access to system 100 in the manner specified in the applicable system standard. However, system 100 is further implemented with appropriate load distribution and shedding logic such that based upon system loading and availability, mobile station 30 is assigned to either of BSC 114 and 116. For example, when mobile station 30 attempts access to the system and there are more mobile stations assigned to BSC 114, mobile station 30 may be assigned to BSC 116. BSC assignment may also be based upon mobile station type, service option, location and/or present or predicted mobility. Moreover, it is contemplated that mobile stations 30 operating in system 100 may be transferred between BSCs 114 and 116 for system balancing. It will be appreciated that numerous suitable mobile station assignment criteria may be implemented without departing from the fair scope of the present invention.

Referring now to FIG. 4, system 100 is shown as system 100' expanded to double capacity. While in the present discussion of preferred embodiments expansion to double capacity is discussed, it will be appreciated that expansion of greater or less amounts may be implemented without departing from the fair scope of the present invention. Existing elements in system 100' as shown in FIG. 3 are assigned the same reference numeral with the addition of the letter "a". Like elements to that shown in FIG. 3 but added to expand capacity of system 100 have a like reference numeral with the addition of the letter "b".

With continued reference then to FIG. 4, system 100' includes BSC 114a, BSC 116a, BSC 114b and BSC 116b respectively coupled to MSC 112. Though a single MSC is shown, multiple MSCs may be employed to further expand capacity and enhance system redundancy. Each of BSCs 114a, 116a, 114b and 116b are coupled to base stations (not shown in FIG. 4) in total service area 122 for providing communication services in each of service areas 118a, 120a, 118b and 120b. As will be appreciated and as shown, each of BSC 114a, 116a, 114b and 116b are assigned one of carriers C1, C2, C3 and C4 in one of service areas 118a, 120a, 118b and 120b. Service areas 118a, 120a, 118b and 120b each cover substantially the same physical area, i.e., total service area 122. (the service areas are shown separated in FIG. 4 for clarity). The BTSs are multiple carrier BTS equipment, or may be combinations of single and multiple carrier BTS equipment, physically sharing a same antenna and related hardware and logically sharing a same physical location in system 100. Alternatively, BSCs 114a, 116a, 114b and 116b may operate carrier pairs in respectively pairs of service areas 118a, 120b, 118b and 120b.

As indicated above, suitable load balancing and shedding logic is implemented, either as part of the BTSs and/or the MSs, but may be implemented as part of the BSCs. Mobile stations 30 attempt access to system 100' in accordance with the applicable standard, and is assigned to one of the carriers, and hence one of the BSCs 114a, 116a, 114b and 116b servicing total area 122.

Figure 5:
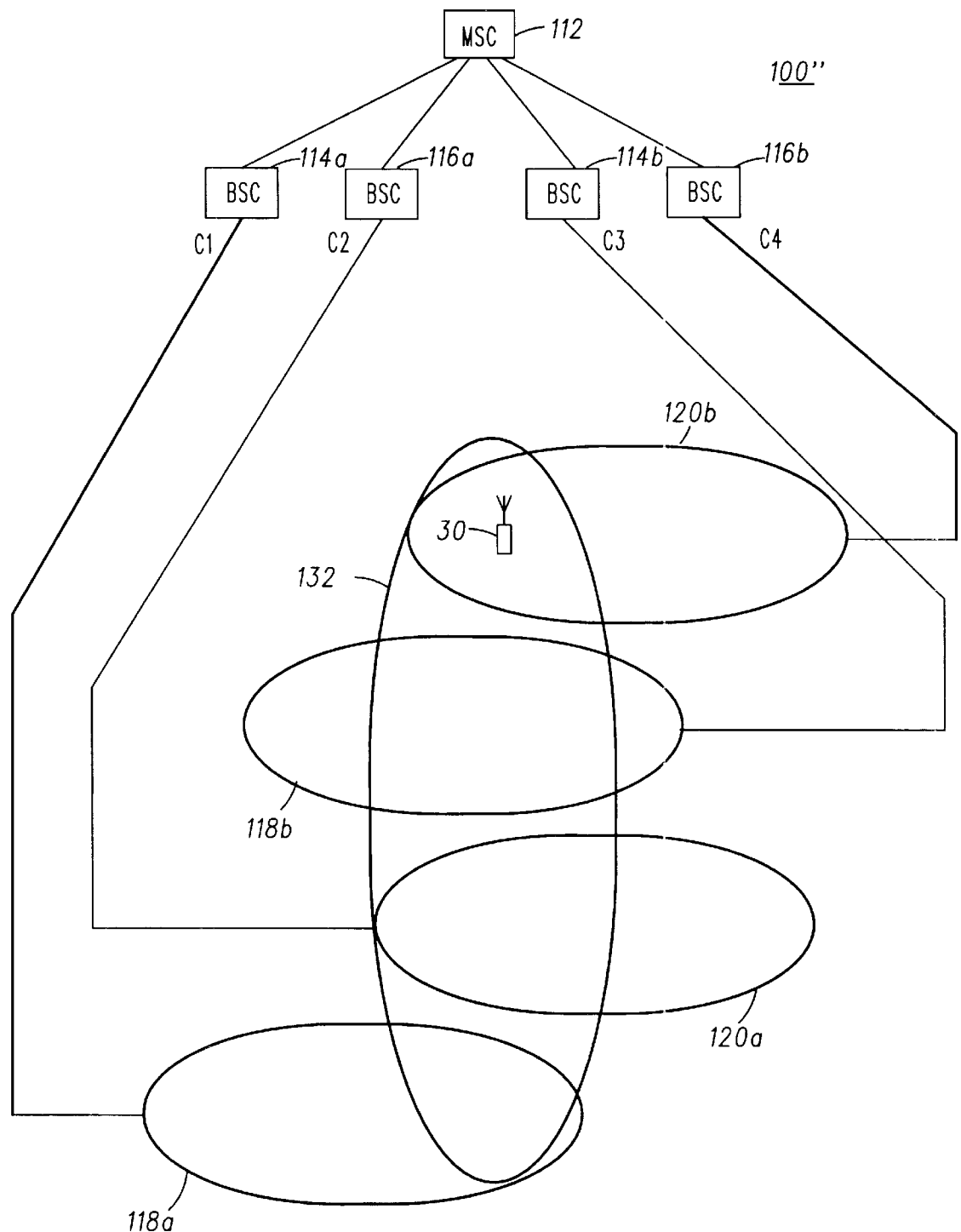
FIG. 5 is a schematic illustration of an wireless communication system expanded to double capacity in accordance with an alternate preferred embodiment of the present invention.

System 100' is shown with each of service areas 118a, 120a, 118b and 120b uniformly overlapping each other and covering the entirety of total service area 122. However, as will be appreciated, based upon base station location and alignment, antenna partitioning and other known techniques for service area configuration, the service areas may be offset. Such an arrangement is shown for system 100" in FIG. 5. Like reference numerals are again used to describe like elements with the addition of a prime designation to service areas 118a', 120a', 118b' and 120b', which are now offset with respect to each other, but share a common portion 132 as shown in FIG. 5. In this manner, expansion may be extended beyond the original total coverage area 122. Or, as is also preferred, aggregating resources in localized areas, such as common portion 132, where communication traffic density is high may enhance communication resource utilization or availability.

With continued reference to FIG. 5, of further note with respect to systems 100 and 100' is that the BSCs 114a, 114b, 116a and 116b may be, and are preferably, located physically remote from each other. In the event of a system failure at one BSC site, the remaining BSCs are available for providing service to total service area 122. Capacity may be reduced due to failure of a piece of equipment, but service area blackouts are eliminated. The BTSs for each of the service areas are preferably co-located within a common base station housing and coupled to the antenna located with the base station housing. More preferably, the BTSs are located within a common equipment rack within the base station housing.

Throughout the discussion of the present invention, a single communication standard for the service areas has been implied. It will be appreciated that the system may be implemented where a first area is serviced by communication equipment according to a first standard and a second service area is serviced by communication equipment according to a second standard. For example, where a first system is adapted for voice communications and a second system is adapted for data communications. Or, where each of the systems is adapted for voice communications, but according to different communication standards. In each case, higher level communication elements logically share base station equipment, while the base stations physically share certain transmission and reception hardware.

Several preferred implementations of the present invention have been disclosed and described with reference to the attached drawings. Those of skill in the are will appreciate that the present invention has application beyond the particular embodiments herein described. Thus, the invention should not be and is not limited to the preferred embodiments shown.

We claim:

1. A wireless communication system comprising:
   a first communications system controller operating according to a communication systems protocol and utilizing a first communication resource;
   a second communications system controller operating according to the communication protocol and utilizing a second communication resource;
   a plurality of base stations located within a wireless communication service area for commonly providing wireless communications services thereto, a first of the base stations being coupled to the first and second communications system controllers and a second of the base stations being coupled to the first and second communications system controllers for respective communication in the service area on the first and second communication resources, respectively, wherein the first and second communication resources are respectively through a mutually exclusive first and second communication carrier frequencies.

2. The wireless communication system of claim 1, wherein the first and second base stations are multi-carrier frequencies base stations including for use of the mutually exclusive first and second communication carrier frequencies.

3. The wireless communication system of claim 2, wherein the transceiver equipment comprises a piece of transceiver equipment from the group comprising: an antenna, an amplifier, an up frequency converter, a down frequency converter.

4. The wireless communication system of claim 1, wherein the service area comprise a first portion offset from a common portion and the first base station services both the first portion and the common portion.

5. The wireless communication system of claim 4, wherein the service area comprises a second portion offset from the common portion and the second base station services both the second portion and the common portion.

6. The wireless communication system of claim 1, wherein the communication protocol comprising one of the group consisting of: code division multiple access (CDMA), time division multiple access (TDMA), global system for mobile communications (GSM) and analog cellular.

7. The wireless communication system of claim 1, wherein the first communication resource is adapted to provide a first communication service type and the second communication resource is adapted to provide a second communication service type.

8. The wireless communication system of claim 7, wherein the first and second communication service types comprise mutually exclusive from one of the group consisting of: voice and data.

9. A method for providing wireless communications to a wireless communications service area comprising:
   providing a first communication controller operating according to a communications protocol and using a first communication resource;
   providing a second communication controller operating according to the communications protocol and using a second communication resource;
   providing a transceiver station coupled to each of the first communication controller and the second communication controller; and logically sharing between the first communication controller and the second communication controller the transceiver station for using the first and second communication resources through a corresponding mutually exclusive carrier frequencies transmitted and received in the service area.

10. The method of claim 9, wherein the transceiver station comprises first and second transceiver units physically co-located and respectively coupled to the first and second communication controllers.

11. The method of claim 10, wherein the first and second transceiver units are each coupled to a common transmit and receive apparatus.

12. The method of claim 11, wherein the common transmit and receive apparatus comprises at least one of the group consisting of: an antenna, an amplifier, an up converter and a down converter.

13. A wireless communication system comprising:
means for controlling a first plurality of communication signals in accordance with a first communication protocol;
means for controlling a second plurality of communication signals in accordance with the first communication protocol;
means, coupled to each of the first and second means for controlling, for transceiving the first and second pluralities of communication signals using a first and second communication resource, respectively, within a common communication services area, wherein the first and second communication resources are through corresponding mutually exclusive carrier frequencies.

14. The wireless communication system of claim 13, wherein each of the first and second means for controlling comprise base station controllers.

15. The wireless communication system of claim 14, wherein each of the base station controllers are remotely located from one another.

16. The wireless communication system of claim 13, wherein the means for transceiving comprises a base transceiver station.

17. The wireless communication system of claim 13, wherein the means for transceiving comprising a first base transceiver stations coupled to the first means for controlling and a second base transceiver station coupled to the second means for controlling, and wherein each of the first and second base transceiver stations are coupled to a common transmit and receive apparatus.

18. The wireless communication system of claim 17, wherein the common transmit and receive apparatus comprises one of the group consisting of: an antenna, an amplifier, an up converter and a down converter.

19. The wireless communication system of claim 17, wherein the first base transceiver station and the second base transceiver station are physically co-located.

20. The wireless communication system of claim 13, wherein the communication protocol comprises one of the group consisting of: code division multiple access (CDMA), time division multiple access (TDMA), global system for mobile communications (GSM) and analog cellular.

21. The wireless communication system of claim 13, wherein the communication protocol comprises one of the group consisting of: voice and data.

* * * * *